United States Patent
Todorovic

(10) Patent No.: US 10,442,543 B2
(45) Date of Patent: Oct. 15, 2019

(54) ENGINE COWLING OF AN AIRCRAFT GAS TURBINE

(71) Applicant: Rolls-Royce Deutschland Ltd & Co KG, Blankenfelde-Mahlow (DE)

(72) Inventor: Predrag Todorovic, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 625 days.

(21) Appl. No.: 15/087,228

(22) Filed: Mar. 31, 2016

(65) Prior Publication Data
US 2016/0288916 A1 Oct. 6, 2016

(30) Foreign Application Priority Data
Apr. 2, 2015 (DE) .................. 10 2015 206 093

(51) Int. Cl.
| | | |
|---|---|---|
| *B64D 29/08* | (2006.01) | |
| *B64D 29/00* | (2006.01) | |
| *B64D 29/02* | (2006.01) | |
| *B64D 29/04* | (2006.01) | |
| *F02K 1/09* | (2006.01) | |
| *B64D 29/06* | (2006.01) | |

(Continued)

(52) U.S. Cl.
CPC ............ *B64D 29/08* (2013.01); *B64D 27/16* (2013.01); *B64D 27/18* (2013.01); *B64D 29/00* (2013.01); *B64D 29/02* (2013.01); *B64D 29/04* (2013.01); *B64D 29/06* (2013.01); *F02K 1/09* (2013.01); *F02K 1/72* (2013.01); *F05D 2230/72* (2013.01); *Y02T 50/44* (2013.01)

(58) Field of Classification Search
CPC ........ B64D 29/00; B64D 29/02; B64D 29/04; B64D 29/06; B64D 29/08; F02K 1/09; F02K 1/72; F05D 2230/72; B64C 1/1446
See application file for complete search history.

(56) References Cited

U.S. PATENT DOCUMENTS 3,703,258 A * 11/1972 Wildner ................... F02K 1/12
239/265.29
3,717,304 A * 2/1973 Sutton ..................... F02K 1/563
239/265.19

(Continued)

FOREIGN PATENT DOCUMENTS

| FR | 2930762 A1 | 11/2009 |
|---|---|---|
| FR | 2978982 A1 | 2/2013 |

(Continued)

OTHER PUBLICATIONS

German Search Report dated Jan. 14, 2016 for counterpart German application No. DE 10 2015 206 093.4.

(Continued)

*Primary Examiner* — Gerald L Sung
*Assistant Examiner* — Marc J Amar
(74) *Attorney, Agent, or Firm* — Shuttleworth & Ingersoll, PLC; Timothy J. Klima

(57) ABSTRACT

The invention relates to an engine cowling of an aircraft gas turbine which has a rear area that comprises at least two doors that are arranged at the bottom area of the rear area of the engine cowling and are to be opened by means of overhead hinges, wherein the hinges are arranged so as to be tilted with respect to the engine axis.

11 Claims, 3 Drawing Sheets

Figure 1:
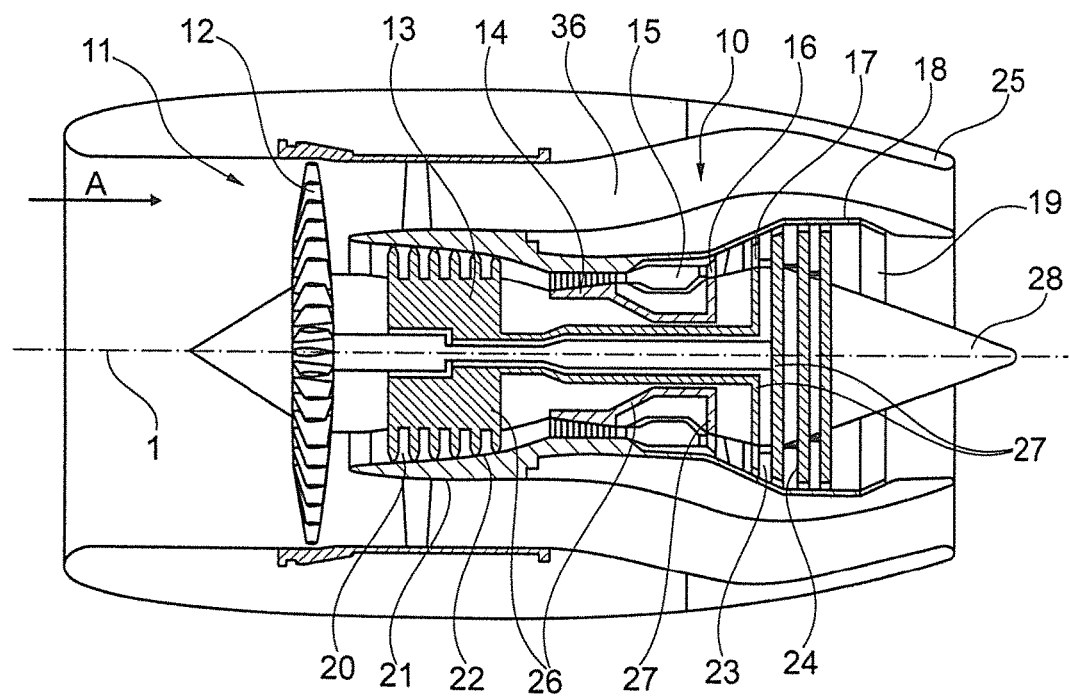

(51) Int. Cl.
*F02K 1/72* (2006.01)
*B64D 27/16* (2006.01)
*B64D 27/18* (2006.01)

(56) References Cited

U.S. PATENT DOCUMENTS

| | | | | |
|---|---|---|---|---|
| 3,759,467 A | * | 9/1973 | Roudil | F01D 21/14 244/110 B |
| 4,585,189 A | * | 4/1986 | Buxton | B64D 29/08 244/129.4 |
| 4,801,112 A | * | 1/1989 | Fournier | F02K 1/72 239/265.29 |
| 4,920,744 A | * | 5/1990 | Garcia | B64D 29/08 244/54 |
| 4,940,196 A | | 7/1990 | Lardellier | |
| 5,157,915 A | * | 10/1992 | Bart | B64D 27/18 244/54 |
| 6,220,546 B1 | * | 4/2001 | Klamka | B64D 29/00 244/129.4 |
| 6,227,485 B1 | * | 5/2001 | Porte | B64D 29/08 244/53 B |
| 6,334,730 B1 | * | 1/2002 | Porte | B64D 29/08 244/129.5 |
| 8,448,896 B2 | * | 5/2013 | Caruel | B64D 29/08 244/110 B |
| 2002/0184874 A1 | * | 12/2002 | Modglin | F02K 1/60 60/226.1 |
| 2003/0102405 A1 | * | 6/2003 | McEvoy | B64D 29/04 244/54 |
| 2004/0227033 A1 | * | 11/2004 | Picard | B64D 27/12 244/54 |
| 2004/0238687 A1 | * | 12/2004 | Jones | B64D 29/08 244/62 |
| 2007/0278345 A1 | | 12/2007 | Oberle et al. | |
| 2008/0258016 A1 | * | 10/2008 | Gukeisen | B64D 29/00 244/53 R |
| 2008/0315034 A1 | * | 12/2008 | Vauchel | B64D 29/08 244/54 |
| 2010/0146933 A1 | * | 6/2010 | Caruel | B64D 29/00 60/226.2 |
| 2010/0327110 A1 | * | 12/2010 | Caruel | B64D 29/08 244/54 |
| 2011/0091317 A1 | * | 4/2011 | Regard | B64D 29/08 415/201 |
| 2011/0174919 A1 | * | 7/2011 | Caruel | B64D 27/26 244/54 |
| 2013/0220435 A1 | | 8/2013 | James | |
| 2014/0000237 A1 | * | 1/2014 | Lucas | F02K 1/72 60/226.2 |
| 2014/0334922 A1 | | 11/2014 | Fabre et al. | |
| 2015/0110613 A1 | * | 4/2015 | Aten | B64C 7/02 415/182.1 |

FOREIGN PATENT DOCUMENTS

| | | | | |
|---|---|---|---|---|
| GB | 585443 A | * | 2/1947 | B64D 29/08 |
| GB | 724052 A | * | 2/1955 | B64D 27/20 |
| WO | WO2008132297 A2 | | 11/2008 | |
| WO | WO-2009138681 A2 | * | 11/2009 | B64D 29/08 |
| WO | WO-2018015672 A1 | * | 1/2018 | B64D 29/08 |

OTHER PUBLICATIONS

European Search Report dated Aug. 18, 2016 for counterpart European patent application No. EP16161869.

* cited by examiner

ENGINE COWLING OF AN AIRCRAFT GAS TURBINE

This application claims priority to German Patent Application DE102015206093.4 filed Apr. 2, 2015, the entirety of which is incorporated by reference herein.

The invention relates to an engine cowling of an aircraft gas turbine, and here in particular to a cowling which allows for an easy access to the individual components of the engine cowling.

From US 2013/0220435, constructions are known in which a rear part of the engine cowling can be swiveled outwards together with the thrust reversal cascades around a swivel axis that is arranged in the area of the engine mounting. Just like in other constructions known from the state of the art, here the disadvantage arises that the areas of the engine cowling that have to be opened are very large and very heavy. In addition to the weight of the areas of the engine cowling to be opened and to the necessity of installing suitable drives, it creates some difficulties to secure the opened areas, so that they remain open reliably, especially as they are subject to wind-gust loads.

Although in such engine cowlings that are to be completely opened for purposes of maintenance the accessibility is improved by some degree, in total this results in very heavy structures which considerably increase the total weight of the engine cowling. In addition, there are hydraulic or electrical systems for opening and closing the engine cowling, which do not only entail high manufacturing costs, but also involve considerable weight. Thus, considerable masses are transported during the flight of the aircraft which are not necessary for the flying function of the aircraft turbine, and this also results in a decrease in the entire aircraft gas turbine's efficiency.

Known constructions have another considerable disadvantage. The rear area of the engine cowling is usually displaced in the axial direction when the thrust reverse function of the aircraft engine is required. In a cowling that has to be completely opened, the drives, guide rails, and the like which are required for this purpose have to be adjusted, either to be easily demountable or in order to not obstruct opening. This also applies to the flow deflecting components, such as for example cascades, or the like. In total, this results in a very complex overall structure, which, as has already been mentioned, is characterized by a high weight and requires multiple additional components that have to be maintained and that can become problematic with respect to operational safety.

The invention is based on the objective to create an engine cowling of the kind as has been mentioned above, which facilitates good accessibility in particular to the rear area of the aircraft gas turbine and offers a high degree of safety, while at the same time also having a simple structure and providing for easy and cost-effective manufacturability, and also involving low weight and low manufacturing costs.

This objective is solved by a combination of features as disclosed herein, with the disclosure also showing other advantageous embodiments.

It is provided according to the invention that the rear area of the engine cowling, which can be displaced in the axial direction in order to facilitate a thrust reverse function and/or in order to modify the cross-section of the exhaust nozzle of the bypass channel, has at least two lateral doors that are arranged at the bottom area of the rear area of the engine cowling and can be opened by means of overhead hinges, wherein the hinges are preferably arranged so as to be tilted with respect to the engine axis.

With the solution according to the invention, it is possible to make the bottom area of the aircraft gas turbine accessible for maintenance work. Here, the two doors can be opened similarly to the doors of a bomb bays (military), while the remaining part of the rear engine cowling, in particular the top and/or front area that adjoin the stationary part of the engine cowling, remain closed. The doors provide for a sufficient accessibility to the areas of those components of the aircraft gas turbine that are relevant for maintenance, and they have an overall size and mass that can be handled easily and in an operationally safe manner. Accordingly, this results in a simple structure in which only few structural elements are necessary and which is also independent of the structural components that are required for displacing the rear area of the engine cowling in the axially longitudinal direction. This, too, contributes to the simplification of the entire structure.

Since according to the invention only two doors that are provided at the lateral bottom area of the engine cowling have to be opened, the entire opening mechanism can be constructed in a simple and low-weight manner. No additional deinstallation measures or the like are required, but instead the doors can be directly swung open for maintenance purposes.

It is particularly advantageous if in the various opening states the respective door is supported by means of dampers. For example, the dampers can be embodied as gas pressure absorbers and designed in such a manner that they have a self-closing effect if the doors are opened just slightly (small swivel angle of the doors), while they open the doors fully and keep them in the opened position if a predefined opening angle is exceeded. Here, the servicing team does not need to install additional support devices and holding rods in order to prevent any unintended closing of the doors. Alternatively or additionally, telescopic gas pressure springs can be provided. In this way, the solution according to the invention can also be used at the ramp area of the airfield in a particularly advantageous manner, despite the winds and air streams that occur there.

In order to facilitate complete opening of the doors and good access to the rear bottom area of the aircraft gas turbine, it is particularly advantageous if the doors are mounted at the side and in such a manner that they can be swiveled backwards. Here, the hinges are preferably arranged below a substantially horizontal central plane of the aircraft gas turbine that also contains the machine axis.

According to the invention this results in smaller doors and smaller hinges as compared to the constructions that are known from the state of the art. Likewise, the closing mechanisms or locks can be dimensioned so as to be smaller and lighter, which results in a lower-weight overall structure requiring less operational force. Therefore, the doors according to the invention can also be opened and closed manually.

In a preferred further development it is also provided that, in the area of the doors, at least one part of the core engine cowling can also be opened through suitable inspection doors. In this manner it is also possible to carry out maintenance measures at the core engine, without having to perform laborious disassembly work.

Thus, the solution according to the invention results in a safe design that renders maintenance processes easier and allows for a considerable weight reduction as compared to the state of the art.

Figure 2:
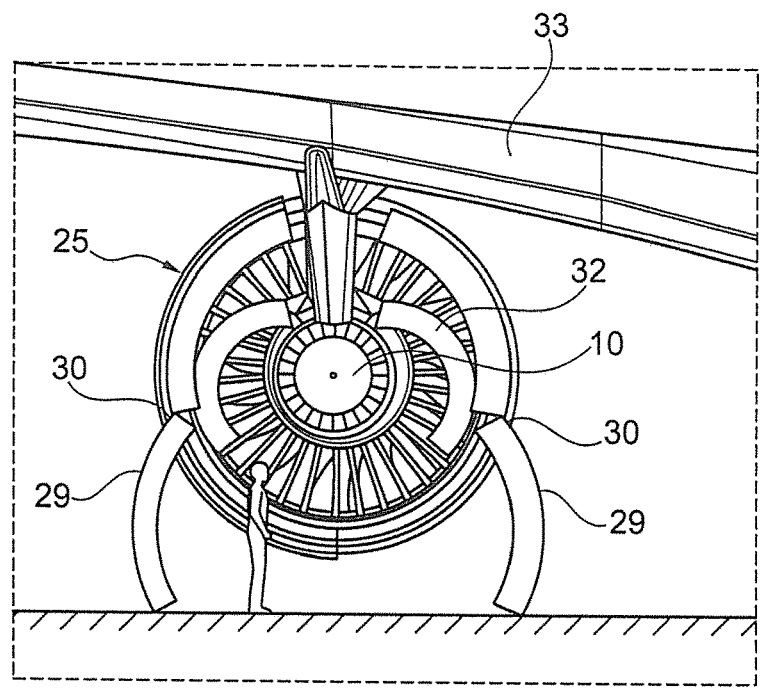
Figure 3:
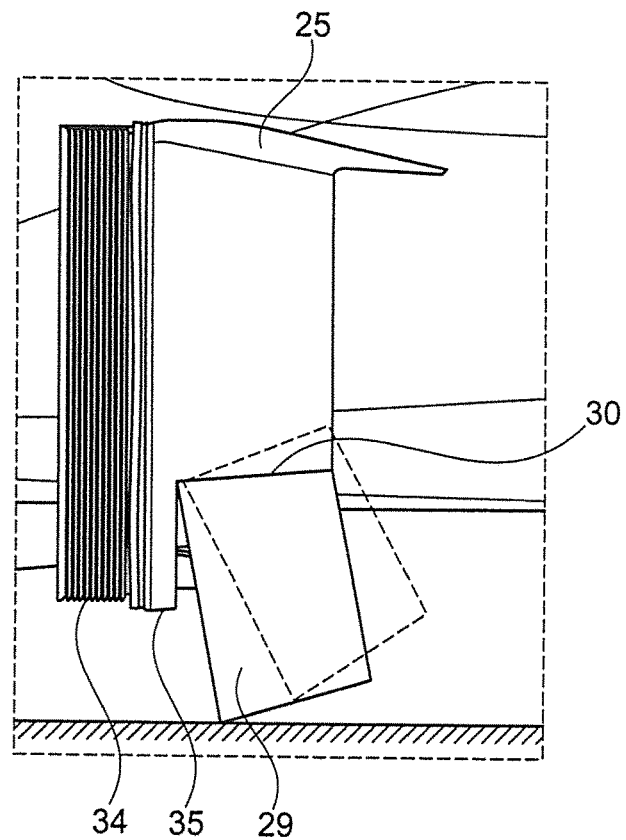
Figure 4:
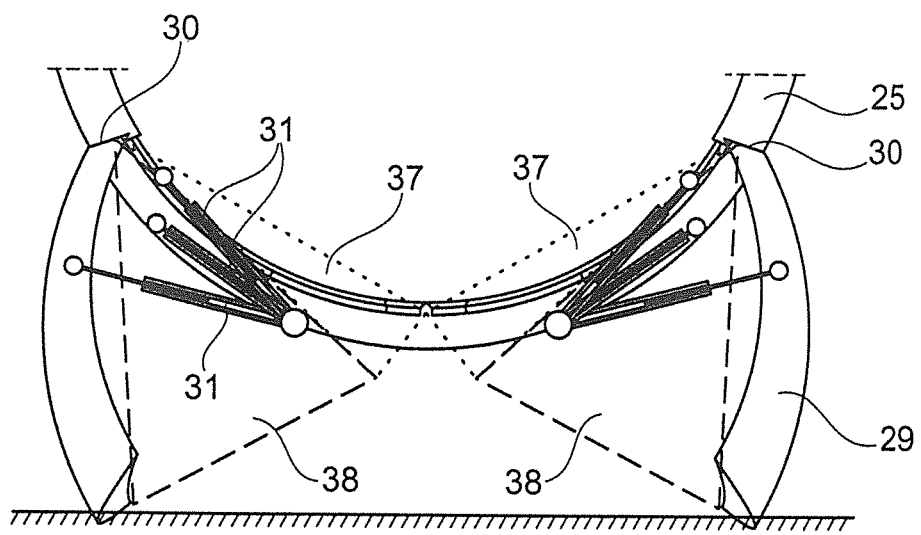
Figure 5:
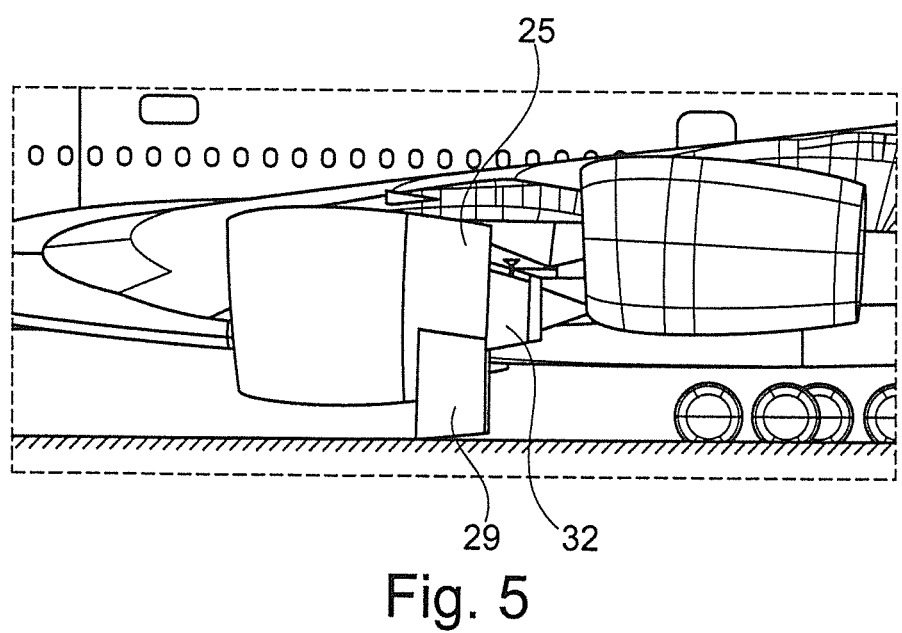

In the following, the invention is described based on the exemplary embodiment in connection to the drawing. Herein:

FIG. 1 shows a schematic rendering of a gas turbine engine according to the present invention, FIG. 2 shows a rear view of an aircraft gas turbine engine that is attached to a wing of an aircraft, with its doors open according to the invention, FIG. 3 shows a schematic view, analogous to FIG. 2, FIG. 4 shows an partial rear view for rendering the dampers, and FIG. 5 shows a side view, analogous to FIG. 2, in the opened state of the doors.

The gas turbine engine 10 according to FIG. 1 represents a general example of a turbomachine in which the invention may be used. The engine 10 is embodied in a conventional manner and comprises, arranged in succession in the flow direction, an air inlet 11, a fan 12 that is circulating inside a housing, a medium-pressure compressor 13, a high-pressure compressor 14, a combustion chamber 15, a high-pressure turbine 16, a medium-pressure turbine 17 and a low-pressure turbine 18 as well as an exhaust nozzle 19, that are all arranged around a central engine axis 1.

The medium-pressure compressor 13 and the high-pressure compressor 14 respectively comprise multiple stages, each of which has an array of fixedly attached, stationary guide blades 20 extending in the circumferential direction, which are generally referred to as stator blades and protrude radially inwards from the core engine cowling 21 through the compressors 13, 14 into a ring-shaped flow channel. The compressors further have an array of compressor rotor blades 22 that protrude radially outwards from a rotatable drum or disc 26 coupled with hubs 27 of the high-pressure turbine 16 or the medium-pressure turbine 17.

The turbine sections 16, 17, 18 have similar stages, comprising an array of fixedly attached guide blades 23 that protrude radially inward from the housing 21 through the turbines 16, 17, 18 into the ring-shaped flow channel, and a subsequent array of turbine blades 24 that protrude outward from a rotatable hub 27. During operation, the compressor drum or the compressor disc 26 and the blades 22 arranged thereon as well as the turbine rotor hub 27 and the turbine blades 124 arranged thereon rotate around the central engine axis 1.

FIG. 2 shows a rear view of an aircraft gas turbine engine that is attached to a wing 33 of an aircraft. Here, the rear area 25 of the engine cowling is visible. Below a horizontal plane that extends through the engine axis 1 (see FIG. 1), hinges 30 are provided at the rear area 25 of the engine cowling, with lateral doors 29 being mounted on them. FIG. 2 shows the engine cowling as well as the doors in an enlarged and thickened rendering, in order to make the functionality more clear. Here, FIG. 2 shows that the bottom area of the aircraft gas engine is freely accessible for maintenance purposes when the doors 29 are open.

In addition, FIG. 2 indicates with the reference sign 32 two lateral inspection doors of the core engine 10 which can be opened independently of the doors 29 of the rear area 25 of the engine cowling so as to provide additional access to the core engine 10.

FIG. 3 shows, in a side view that is analogous to the rendering of FIG. 5, that the doors 29 according to the invention are provided only at the rear bottom area of the rear engine cowling. The rest of the rear area 25 of the engine cowling, which can be displaced in the axial direction, is not modified for the doors 29 according to the invention and thus does not require any additional measures. In particular it is not necessary to disassemble the thrust reversal elements 34, which are shown in FIG. 3 only schematically, for the purpose of opening the cowling. Instead, the thrust reverse elements 34 (cascade elements, or the like) can remain at a front area 35 of the rear engine cowling 25.

FIG. 3 illustrates the effect of the inclined position of the hinges 30 according to the invention. Thanks to it, the doors 29 are not only swung open, but also swiveled backwards to some degree. In this manner, ground clearance as well as accessibility is improved.

In FIG. 5, the situation according to FIG. 3 is shown in a clarifying manner in side view, wherein it particularly becomes clear that the outer engine cowling does not have to extend over the entire length of the core engine. Rather, the present invention can also be used in shorter engine cowlings and accordingly shorter bypass channels 36 in an advantageous manner.

FIG. 4 shows a simplified view of the doors according to the invention and illustrates that they can be supported and held in place by length-adjustable dampers. The dampers can for example be embodied as piston-cylinder units, and here in particular as gas pressure absorbers. According to the invention, it is therefore not necessary to provide additional support mechanisms or the like for the doors. Here, the dampers are preferably embodied in such a manner that they have a self-closing tendency when the doors are opened to a small degree. This opening area is schematically marked by the triangle 37. If the doors 29 are opened further (opening area 38), the dampers 31 show the tendency to open independently. This supports the manual operation of the doors 29. FIG. 4 respectively shows three different positions of the dampers 31, which result from the respectively different opening positions of the doors 29.

PARTS LIST 1 engine axis
10 gas turbine engine/core engine
11 air inlet
12 fan
13 medium-pressure compressor (compactor)
14 high-pressure compressor
15 combustion chamber
16 high-pressure turbine
17 medium-pressure turbine
18 low-pressure turbine
19 exhaust nozzle
20 guide blades
21 core engine cowling
22 compressor rotor blades
23 guide blades
24 turbine rotor blades
25 rear area of the engine cowling
26 compressor drum or compressor disc
27 turbine rotor hub
28 outlet cone
29 door
30 hinge
31 damper
32 inspection door
33 wing
34 thrust reversal element
35 front area
36 bypass channel
37 closing area
38 opening area

The invention claimed is:

1. An engine cowling of an aircraft gas turbine, comprising:
   wherein the engine cowling has a rear area;
   wherein the aircraft gas turbine has a center engine axis establishing a substantially horizontal central plane of the aircraft gas turbine;
   a hinge arranged below the substantially horizontal central plane and angled with respect to the center engine axis to establish a hinge axis that is nonparallel to the center engine axis;
   a maintenance access door positioned in the rear area below the substantially horizontal central plane when in a closed position, the maintenance access door having an upper portion and a lower portion, the upper portion positioned nearer the substantially horizontal central plane than the lower portion when in the closed position, the maintenance access door pivotally mounted to the hinge only at the upper portion;
   the hinge axis oriented such that an entirety of the lower portion pivots rearward and upward when the maintenance access door is moved to an open position;
   wherein the lower portion extends from a forward edge to an aft edge of the maintenance access door.

2. The engine cowling according to claim 1, and further comprising a damper for supporting the maintenance access door in various opening states.

3. The engine cowling according to claim 2, wherein the damper includes a piston-cylinder unit.

4. The engine cowling according to claim 2, wherein the damper is mounted with respect to the door to have a toggling over center action with respect to the maintenance access door.

5. The engine cowling according to claim 1, wherein the rear area is displaceable in an axial direction.

6. The engine cowling according to claim 1, and further comprising thrust reversal elements mounted in the rear area.

7. The engine cowling according to claim 1, and further comprising a core engine cowling including inspection doors positioned in an area of the maintenance access door.

8. The engine cowling according to claim 7, wherein the inspection doors are operable independently of the maintenance access door.

9. The engine cowling according to claim 3, wherein the piston-cylinder unit includes a gas pressure absorber.

10. The engine cowling according to claim 2, wherein the damper supports an opening process or a closing process of the maintenance access door.

11. The engine cowling according to claim 1, wherein the hinge axis is oriented closer to parallel with the center engine axis than being oriented at 90° to the center engine axis.

* * * * *